J. D. WILLOUGHBY.
Seed Dropper.
No. 21,102.
Patented Aug. 3, 1858.
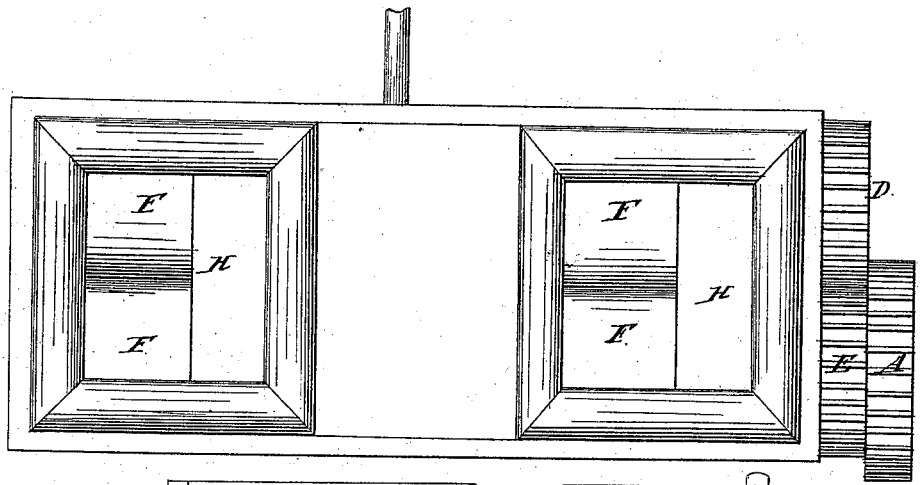
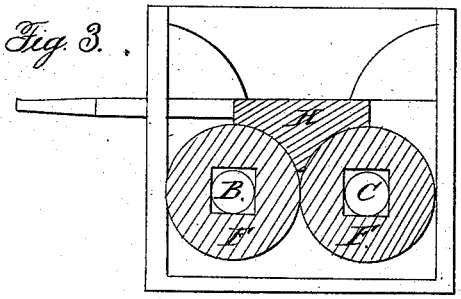
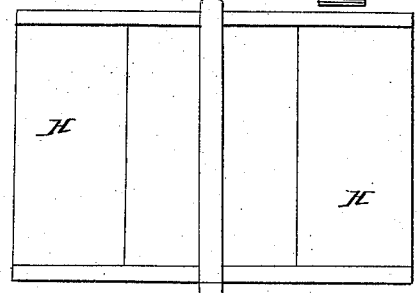
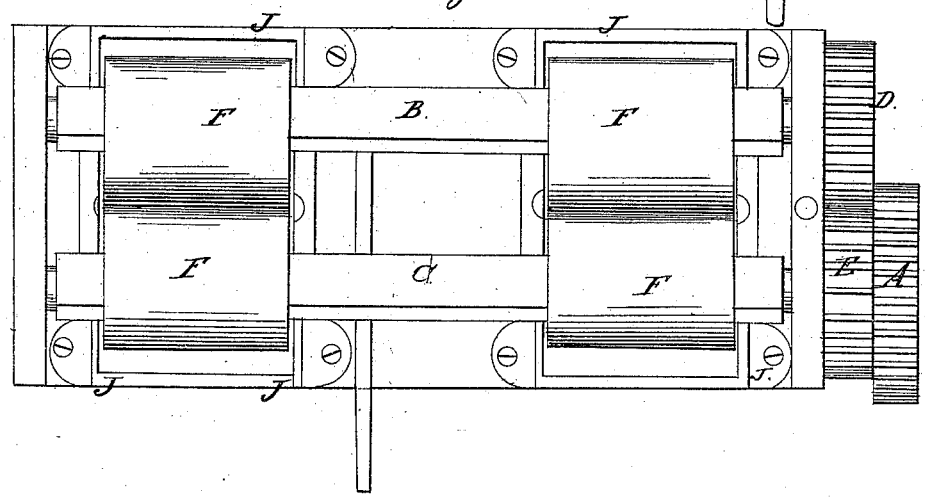

UNITED STATES PATENT OFFICE.

J. D. WILLOUGHBY, OF CARLISLE, PENNSYLVANIA.

IMPROVEMENT IN SEED-PLANTERS.

Specification forming part of Letters Patent No. 21,102, dated August 3, 1858.

*To all whom it may concern:*

Be it known that I, JAMES D. WILLOUGHBY, of Carlisle, Pennsylvania, have invented certain new and useful Improvements in Seed-Planters; and I do hereby declare that the following is a full, clear, and exact description of the same, reference being had to the accompanying drawings, and to the letters of reference marked thereon.

The nature of my invention consists in the employment of the several parts of the machine in the relations which will be hereinafter fully described.

In order that those skilled in the arts may use and manufacture my invention, I will proceed to describe its construction and operation.

In the annexed drawings, Figure 1 represents a top view of the machine. Fig. 2 represents a bottom view of the machine. Fig. 3 is an end view with the end removed. Fig. 4 is a view of the slide.

A represents a cog-wheel, which works into another cog-wheel on the running-gear of the planter. The shafts B and C are made to rotate toward each other at the same speed by means of the pinions D and E. These shafts receive their motion from the running-gear of the planter through the wheel A, and are supported at each end, and when long are supported in the middle, so as to keep the centers at a certain distance apart.

F F F F are pieces of india-rubber two inches long and two inches in diameter, with square holes in them to fit the shafts on which they are put. When these shafts are placed in proper position they are two inches apart, so that the rubber on one shaft will touch the rubber on the other when they revolve together. The shafts are placed under the bottom of the hoppers, with the rubber rollers directly under the holes in the bottom of the said hoppers. These holes in the hoppers are two inches square, for the purpose of letting the seed down onto the rubber rollers.

As different persons may wish to sow different quantities of seed to the acre, it is therefore necessary to have some mode of altering or regulating the discharge of seed. To accomplish this, I place the slide H between the bottom of the hopper and the upper side of the rubber. The slide H will be seen in Figs. 3 and 4, its shape being clearly shown in Fig. 3. It is flat on top, the two under sides being concave to fit the rollers, and the point between the two concaves running down between the two rollers, as is seen in Fig. 3. By forming the slide H in this manner, and by sliding it along over the rubber rollers, thus shutting the seed off from contact with them, as small or as great an amount of seed may be sown as may be required.

J are iron frames, fastened to the bottom of the hopper with pieces that extend down between the shafts and fit against the ends of the rubber where the rubber of each shaft touches the rubber of the other shaft. These frames are put on for the double purpose of keeping the rubber from sliding on the shaft endwise and to keep the seed from flying out at the end of the rubber, as experience teaches it would do were there not something to prevent it.

In operating this machine, motion being given to the shafts by means of the cog-wheel A and pinions D and E, so that as the rubber rollers turn they revolve toward each other. The seed being placed in the hopper, it falls between the rollers and is carried out between them. As the rollers fit closely together, the seed, in order to pass down, must indent the rollers, and it is thus pressed tightly as it passes through, but not in any way injured.

The slide being so arranged that more or less of the rollers may be exposed to the seed, it is evident that a smaller or larger amount of seed may be distributed, according as the slide is regulated.

Having thus fully described my invention, what I claim as new, and desire to secure by Letters Patent, is—

The arrangement of the rollers F F, placed horizontally, with the slide H, as constructed, for regulating the discharge of seed, and the frame J for keeping said rollers in place and preventing the lateral discharge of seed, as is herein fully set forth.

J. D. WILLOUGHBY.

Witnesses:
C. M. ALEXANDER,
A. A. YEATMAN.